(No Model.)
W. HEATON.
GATE.
No. 564,071. Patented July 14, 1896.
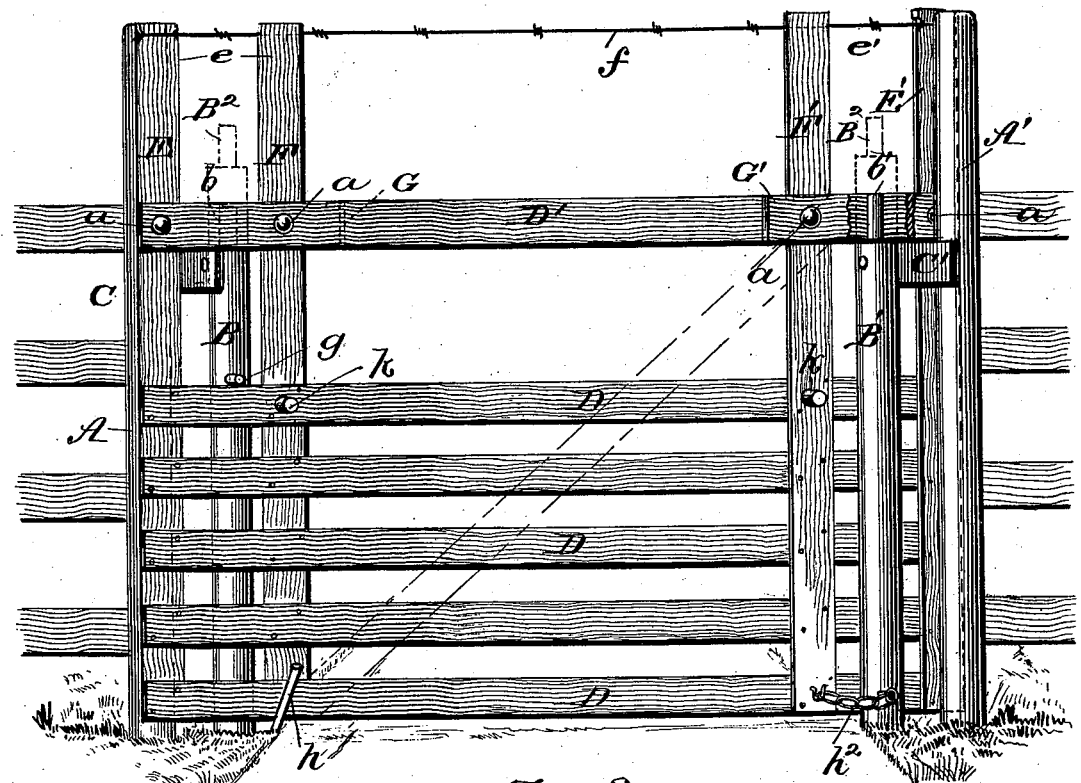
Fig. 1.
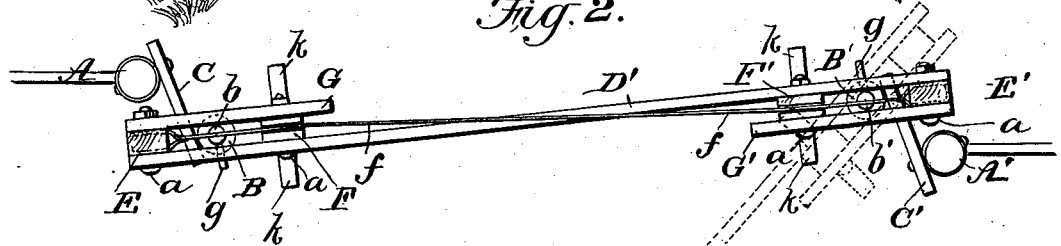
Fig. 2.
WITNESSES:
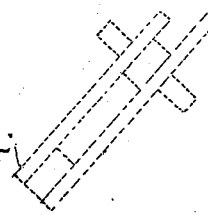
INVENTOR
William Heaton
BY
ATTORNEYS.

UNITED STATES PATENT OFFICE.

WILLIAM HEATON, OF ALLERTON, ILLINOIS.

GATE.

SPECIFICATION forming part of Letters Patent No. 564,071, dated July 14, 1896.

Application filed March 13, 1896. Serial No. 583,104. (No model.)

*To all whom it may concern:*

Be it known that I, WILLIAM HEATON, of Allerton, in the county of Douglas and State of Illinois, have invented a new and useful Improvement in Gates, of which the following is a specification.

The object of my invention is to provide a cheap, simple, and easily-operated gate, which any farmer may make for himself, and which may be so hinged as to be opened or swung from either end, or may be entirely lifted off and set to one side when necessary.

To these ends it consists in the special construction of the parts of the gate and its arrangement in relation to the posts, as will be hereinafter more fully described with reference to the drawings, in which—

Figure 1 is a side elevation with parts broken away, and Fig. 2 is a plan view with the gate closed and showing its opened position in dotted lines.

Each end of the gate is constructed and arranged exactly alike, and each end is provided with posts of the same construction and arrangement. There are two of these posts at the left, one a long post A, and the other a short post B, which are planted in the ground and connected at the top by a short cross-bar C.

A' B' C' represent the corresponding posts and cross-bar at the opposite end of the gate. These posts A and B and A' B' and the cross-bars C and C' are set at an angle to the plane of the gate, and the posts A A' are upon opposite sides of the gate, the short posts B and B' occupying a position within the plane of the gate, while the long posts A and A' are a little to one side of the plane of the gate.

The gate itself is composed of any suitable number of horizontal bars D, connected at each end by two vertical parallel bars E F and E' F', the bars E F at one end being on the opposite side of the gate from the bars E' F'. The top bar D' is secured to the vertical bars E F and E' F' by bolts $a$, which also pass through and secure short horizontal bars G and G', one at each end of the gate. These short bars G and G' form between themselves and the top bar D' of the gate spaces into which are received the reduced ends $b$ and $b'$ of the short posts B and B', which ends act as pintles and form a sort of hinge connection. The gate is hung from this point at each end, and bears upon the shoulders of the short posts B and B' and the connecting cross-bars C and C' at the tops of these posts.

To give the gate greater height, the vertical bars E F and E' F' are extended above the top bar D' of the gate, as at $e$, and are connected at the tops by a line $f$ of barbed wire.

This gate when closed hangs upon the tops of the short posts and the connecting cross-bars C C', and is prevented from being lifted up by a removable pin $g$, entering the short posts just above the upper one of the bars D of the gate, while the lower part of the gate is prevented from being swung open by a pin $h$, entering the ground or other point of attachment at one end, and a short detachable chain $h^2$ at the other end.

I will now describe how this gate may be opened from either side or end, or be taken entirely off its hinges and set to one side. Supposing it is to be opened toward the person on this side of the gate, looking at it as in Fig. 1, the pins $g$ and $h$ are removed at the left-hand end of the gate, and the gate at this end is lifted bodily until the bars D' and G are raised above the reduced end $b$ of the short post B, and the gate then is swung inwardly, or toward the person, about the reduced end $b'$ of post B' on the right, which then forms its hinging and supporting point, as shown in dotted lines in Fig. 2. If the gate is to be opened from the opposite side and opposite end, the pins and chain at that end are removed, and that end of the gate is lifted off the reduced end of post B', and the reduced end of post B becomes the hinge center, and the gate swings in the opposite direction.

If it is desired to lift the gate entirely off its hinges, the pins and chains at both ends are removed, and the gate is lifted bodily until its bars D' and G G' are above the reduced ends of both the posts B and B', and the gate may then with a slight turn be lifted entirely away from its closed position. This gives the widest possible roadway between the gate-posts, and is useful at times when passing large agricultural implements, like reapers, through the same.

This gate, it will be seen, can be easily lifted and opened when snow is on the ground, and may be hung so as to swing above the snow by a removable section placed on the top of posts B and B', as shown in dotted lines at B² in Fig. 1.

If desired, oblique braces may be applied to the gate, as shown in dotted lines, so as to stiffen it, as may be necessary when wide gates are used.

To facilitate lifting and operating the gate, handles k are fastened on the bars of the gate.

Having thus described my invention, what I claim as new, and desire to secure by Letters Patent, is—

1. A gate having a hinge connection at each end, said gate consisting of horizontal bars having at each end two vertical parallel bars, the upper horizontal bars at each end being doubled upon the opposite sides of the vertical bars to form hinging and supporting spaces; in combination with two posts at each end, the shorter being connected to the longer by a cross-bar and having its end protruding into the space between the top bars of the gate and forming a pintle substantially as shown and described.

2. A gate having a hinge connection at each end and consisting of horizontal bars, two vertical parallel bars at each end, the horizontal bars being doubled at the top on opposite sides of the vertical bars to form hinging and supporting spaces; in combination with two posts at each end set at an angle to the plane of the gate and connected at the top by a cross-bar, the ends of the shorter posts being entered into the hinging-spaces of the gate, and removable pins for preventing the gate from being lifted substantially as shown and described.

WILLIAM HEATON.

Witnesses:
W. D. A. O'BRIEN,
E. S. HURON.